United States Patent
Sirot

[11] 3,902,755
[45] Sept. 2, 1975

[54] ADJUSTABLE SEATS, PARTICULARLY FOR USE IN AIRCRAFT

[76] Inventor: Robert Antoine Sirot, 57, Avenue Marceau, Paris 16, France

[22] Filed: Dec. 20, 1973

[21] Appl. No.: 426,869

[30] Foreign Application Priority Data
Dec. 22, 1972 France ............................... 72.45956
Feb. 13, 1973 France ............................... 73.04989
Nov. 9, 1973 France ............................... 73.39872

[52] U.S. Cl. .............. 297/339; 244/122 R; 297/354
[51] Int. Cl.² ......................................... A47C 1/031
[58] Field of Search .......... 297/337, 338, 339, 330, 297/354, 341, 346, 347, 317, 318, 328, 329, 322, 349; 248/394, 395, 396, 400, 404, 419, 420, 429; 244/122 R; 91/402; 92/130, 131

[56] References Cited
UNITED STATES PATENTS
| | | | |
|---|---|---|---|
| 257,065 | 4/1882 | Pursell | 297/338 |
| 1,018,400 | 2/1912 | White | 92/131 |
| 1,455,223 | 5/1923 | Paoli | 91/402 |
| 1,747,644 | 2/1930 | Oliver | 297/339 |
| 2,016,133 | 10/1935 | Chandler | 297/318 |
| 2,379,385 | 6/1945 | Styers | 244/122 R |
| 2,597,332 | 5/1952 | Janes | 297/347 |
| 2,615,499 | 10/1952 | Wallace | 297/347 |
| 3,286,971 | 11/1966 | Walter et al. | 297/337 |
| 3,326,604 | 6/1967 | Billingham et al. | 297/349 |
| 3,368,845 | 2/1968 | Watanabe | 297/347 |

FOREIGN PATENTS OR APPLICATIONS
| | | | |
|---|---|---|---|
| 897,955 | 6/1962 | United Kingdom | 297/347 |
| 1,451,199 | 9/1966 | France | 297/338 |

*Primary Examiner*—Trygve M. Blix
*Assistant Examiner*—Galen L. Barefoot
*Attorney, Agent, or Firm*—Alan H. Levine

[57] ABSTRACT

A chair especially for use in aircraft in which the seat is elevateable by a lifting device such as a fluid ram and there being a connection between the seat and back of the chair such that as the seat is elevated it is moved forwards relative to the base of the chair and as it is lowered it is moved rearwardly relative to the base of the chair. A locking device may be provided for relatively locking the back and seat in adjusted positions.

22 Claims, 10 Drawing Figures

ADJUSTABLE SEATS, PARTICULARLY FOR USE IN AIRCRAFT

The present invention relates to an adjustable seat especially for use in aircraft.

Chairs of adjustable height are already known in which the "seat" part (i.e. the substantially horizontal part on which the occupant is seated) always remains integral with the back, excluding the limited variations in the size of the dihedral angle defined by the seat and the back. More particularly, as regards adjustment of the chairs height, it is the joint "seat-back" arrangement which is subject to adjustment.

The present invention relates to a chair which comprises a fixed base, a back connected to the base and a seat which may be vertically adjusted by means of at least one adjustment device provided between the seat and the base and allowing, at the same time as a variation in height of the seat, a displacement of the latter in a forwards-rearwards direction with respect to the fixed base, said seat being connected to the back by at least one retaining connection capable of maintaining a certain spacing between the rear part of the seat and the front part of the back.

The chair according to the invention comprises at least one fixed base each supporting a jack whereof the body is possibly moulded integrally from the same material as the base, and whose structure may be metallic or plastic or of any other material.

Embodiments of a chair according to the invention will now be described in more detail hereafter, by way of example referring to the accompanying diagrammatic drawings, in which.

Figure 1:
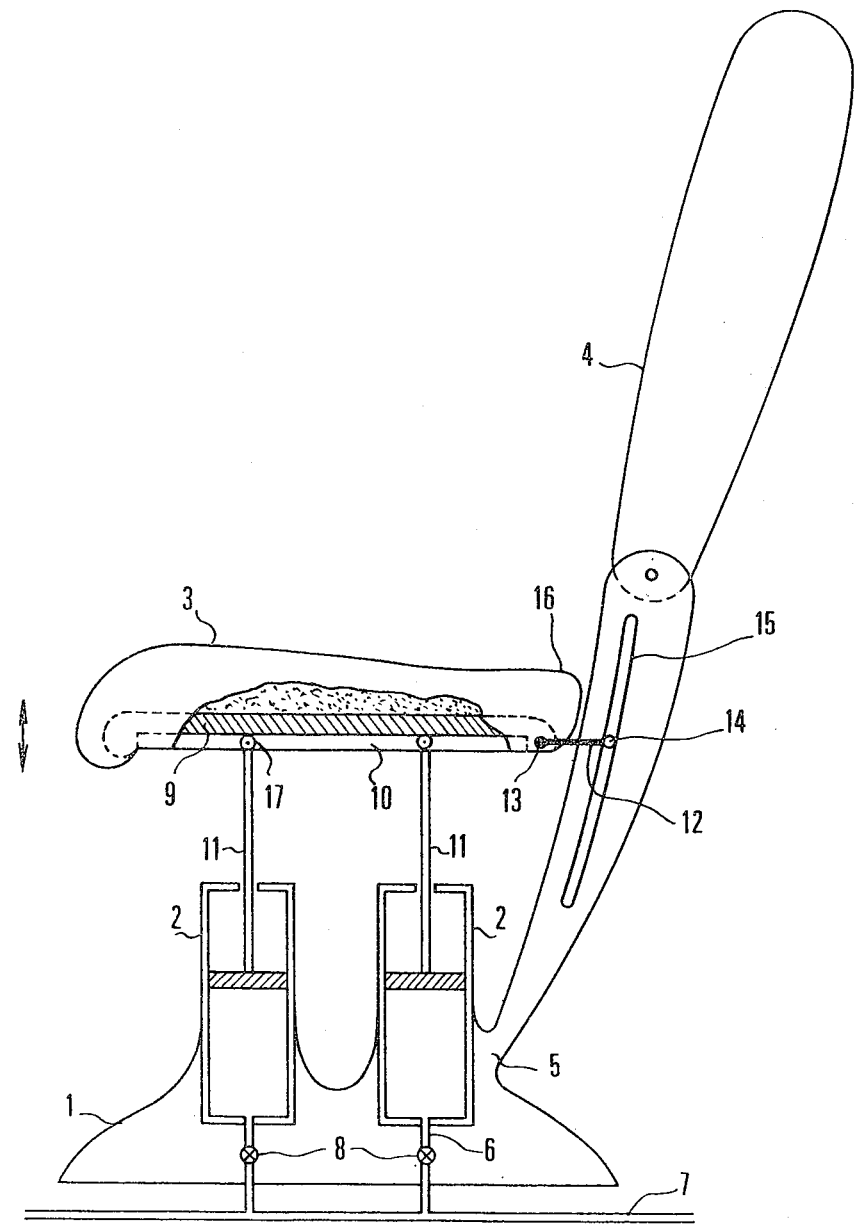
FIG. 1 is a side view of a chair according to the invention.
Figure 3:
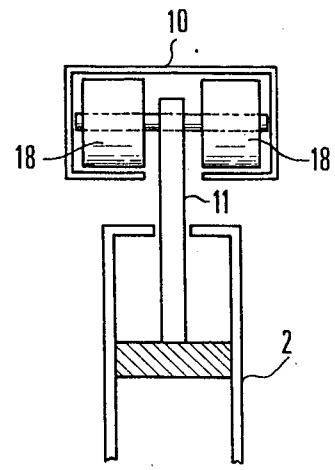
FIG. 3 is a sectional view of the upper part of a jack used in the chair and provided with roller means.

Referring firstly to FIGS. 1 and 3, the chair has a fixed base 1 integral with pneumatic jacks 2 facilitating the adjustment in height of the seat 3. The back 4 is fixed to the base 1 in the region 5 by any convenient means (not shown). These means may make the back 4 completely integral with the base 1, or allow in inclination of the back 4 relative to the base 1. In this embodiment, the jacks 2 are pneumatic jacks supplied through pipes 6 which open into a general air supply system 7. The fluid energy supplied to these pneumatic jacks may be taken from a fluid system on board the aircraft or be produced by individual pumps belonging to each arm-chair. The supply of fluid to the pneumatic jacks 2 through the intermediary of the pipes 6 is regulated by valves 8. These valves 8 are controlled by the passenger by means of any appropriate conventional system for distributing fluid. Control of the pneumatic jacks 2 makes it possible for the seat 3 to occupy a number of different levels at the passenger's will. The lower part of the seat 3 is constituted by a carriage 9 comprising guide rails 10 (see FIG. 3). The upper ends of the rods 11 of the jacks 2 are provided with roller means 17 which slide in the guide rails 10. These roller means are illustrated in more detail in FIG. 3, which shows rollers 18 able to roll in the rail 10. A rod 12 integral with the carriage 9 at the location 13 is provided at its other end with a pulley or follower 14 which slides in a guide groove 15 provided on the edge of the back 4. This retaining connection between the seat 3 and the back 4, constituted by the rod 12, makes it possible to obtain an almost perfect tangency between the rear part 16 of the seat 3 and the front part of the back 4. Since the back 4 is connected to the base 1, then during a height adjustment, a movement in the forwards-rearwards direction is imparted to the seat 3 owing to the retaining connection constituted by the rod 12. This movement in the forwards-rearwards direction of the seat 3 is achieved by the rolling of the rollers 18 inside the guide rail 10.

Figure 2:
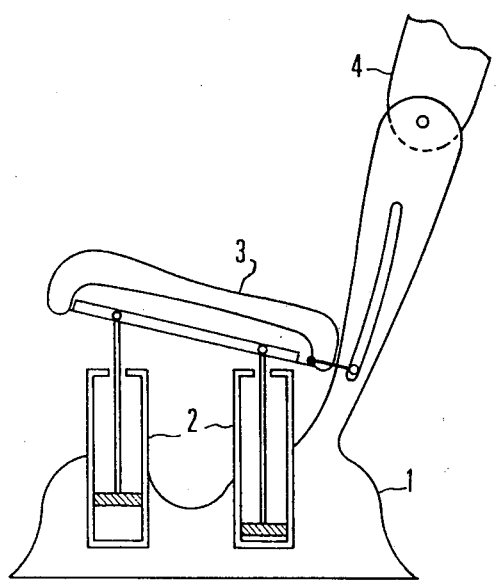
FIG. 2 shows a modified chair with the seat inclined towards the rear when it occupies a low position.
Figure 4:
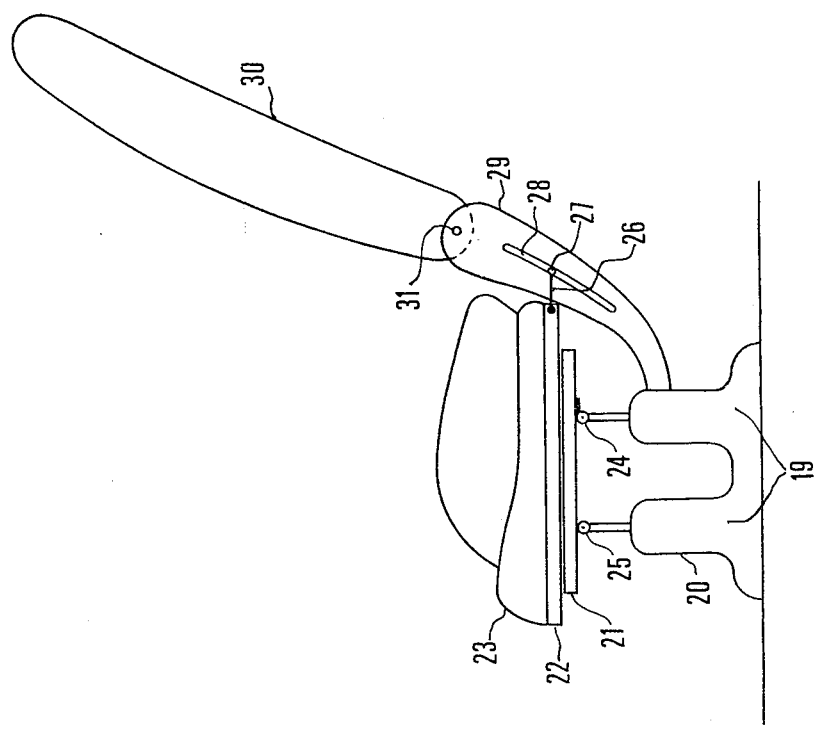
FIG. 4 shows an embodiment of a chair, comprising two jacks, and which is in an intermediate position.

FIG. 2 shows an embodiment of the invention in which the rear jack or jacks have a different adjustment to the front jack or jacks. These pneumatic jacks may for example have different strokes, which allows a variation in position of the seat 3. In the embodiment of FIG. 4, the seat 3 is inclined rearwards when it occupies its lower position.

This inclination of the seat 3 may be particularly achieved by the use of the rollers 18, such as those shown in FIG. 3 which allow the lower plane of said seat 3 not to remain constantly perpendicular to the vertical rods 11 of the pneumatic jacks 2.

The chair produced according to the invention may be used in the following manner. When the chair is unoccupied the seat 3 is in the upper position. When the passenger sits down, he thus causes a rapid and gentle descent to the lower position; this relaxation position allows the passengers to stretch out their legs and thus use the space located under the seat in front. In order to get up without difficulty, the passenger actuates the pneumatic jacks in order to raise the seat into the upper position.

In another embodiment, such as that shown in FIG. 4, the seat is provided with two bases provided under the seat arrangement which they support on the right and left hand side through the intermediary of the pistons of four jacks 20.

By seat arrangement, we mean the arrangement constituted by:

a plate 21 connected to the pistons of the jacks 20 by means ensuring forwards and rearwards variations of position and preventing tilting movement towards the right or left;

a carriage 22 which slides on this plate 21 and which is longer than the latter in the fore-and-aft direction;

the seat 23 which is integral with this carriage 22 and has the same dimensions as the latter and which generally comprises one or more cushions.

Provided on each of the bases 19, on the right and on the left, are two jacks 20, one at the front and the other at the rear. At the upper limit of their travel, the upper ends of the four jacks 20 are located in the same horizontal plane. At the lower limit of their travel and on account of a desired difference, the upper ends of the two front jacks stop in a parrallel plane above the plane in which the upper ends of the two rear jacks are located, at the end of their travel.

During the downwards movement of the seat arrangement, at the end of its travel, the latter will thus undergo a progressive variation of its position, which inclines rearwards such that the dihedral angle formed by the general half-planes of the seat and of the back varies. To facilitate such a variation of position of the seat 23, it is necessary to provide the rods of the rear jacks with pivots or hinges 24 and the rods of the front jacks with rollers 25.

During its upwards and downwards movements, the rear edge of the seat must always remain tangential to the front face of the back across which it sweeps in a downwards movement and vice versa. This movement is ensured by three factors:

the seat 23 is mounted on a carriage 22 which ensures its rearwards displacement;

this carriage 22 slides on a plate 21 connected to the top of the rear jacks by hinges 24 allowing this plate 21 to vary its position, i.e. allowing the seat to tilt rearwards and vice versa, but not from right to left. At the front, the rods of the jacks terminate in rollers 25 which abut against and roll on the lower surface of the plate 21;

the seat is retained at the rear by two rods 26 permanently fixed to the two sides of the carriage 21, parallel to these sides, but in a plane which may be different to that of the carriage 22 and whose rear ends are provided with followers or pulleys 27 which roll or slide in two curved rails or slides 28 provided in the lower part of the back 29; the horizontal planes passing through the upper and lower ends of these rails or slides are approximately 120 to 200 mm. apart.

The back comprises two separate parts:

the lower part 29 is stationary and made integral at its lower ends and lateral parts with the jack bodies such that one may consider that the jacks and lower stationary part of the back constitute the frame of the seat, capable of withstanding accelerations and supporting the mountings for the safety belt;

the upper part 30 of the back may tilt forwards into a horizontal position pivoting about the pivots 31 which connect the two parts of the back. It may also tilt towards the rear to promote relaxation, particularly when the seat has been brought into the lower position. The mechanism for these movements and the return of the back to a forwards position when it has been previously tilted towards the rear are similar to those currently employed in the chairs of certain air lines.

According to another variation of the invention, the seat is provided with a single base having two jacks located one behind the other and having the same difference in stroke as hereinbefore mentioned. If the two jacks are sufficently close together, the base bolted to the floor may revolve and allow the seat to rotate about itself.

Figure 5:
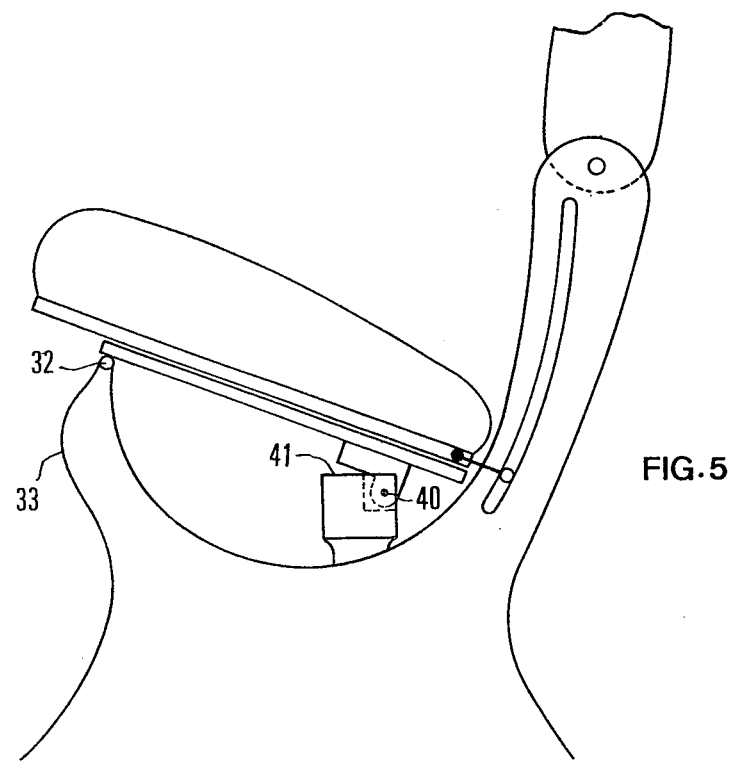
FIG. 5 is a side view of a modified chair, comprising only one jack, said chair being in its lower position.
Figure 6:
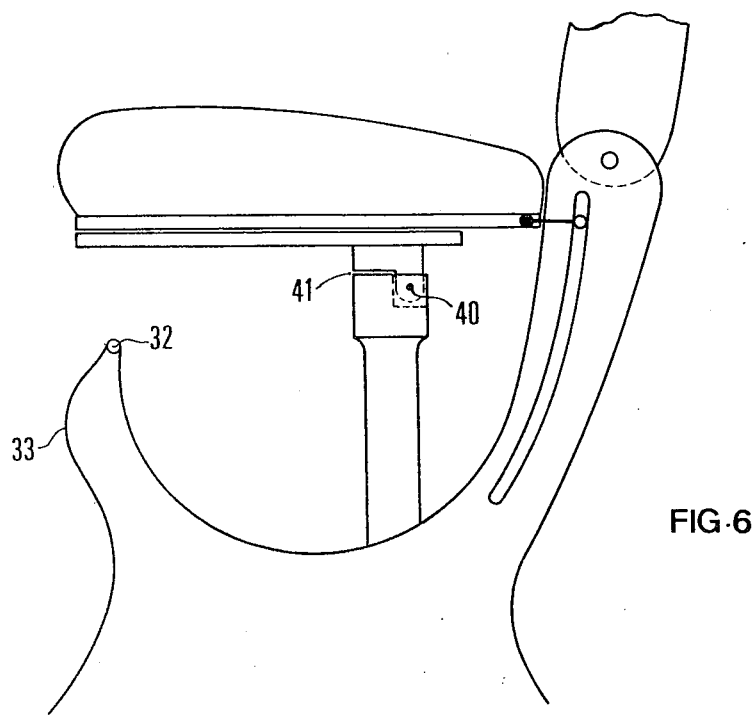
FIG. 6 is a side view of the chair of FIG. 5 in its upper position.

According to another embodiment of the invention, (FIGS. 5 and 6) the chair is provided with two bases, supporting the seat arrangement on the right and left hand side, but each through the intermediary of a single jack.

The two jacks, one on the right and the other on the left supports are arranged such that the axis of thrust of the jacks is substantially opposed to the axis of downwards thrust of the passenger's body at the exact point where the pressure exerted by his body on the seat cushion is maximum (approximately 500 g/cm$^2$). Under these circumstances, the additional function of damping and suspension of the jacks is best ensured.

During its descending movement, the inner face of the plate of the seat arrangement bears against stops 32 supported by buttresses 33 possibly moulded integrally with the front side of the bodies of the jacks. Their major axis is directed upwards and forwards. At their upper ends, the stop may be provided with a rolling means.

Figure 7:
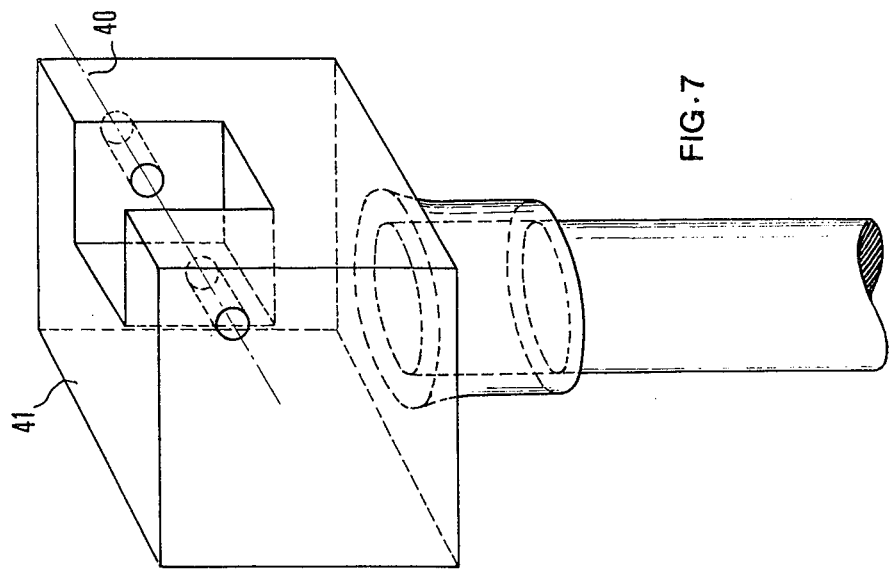
FIG. 7 shows a particular embodiment of a connecting member between a jack piston and the platform of the seat of a chair according to the invention.

These stops come into contact with the plate before the pistons have completed their stroke. The seat arrangement thus tilts progressively rearwards pivoting about the axis 40 of the device shown in FIG. 7, which connects the upper ends of the two pistons to the seat arrangement. This device facilitating the rearwards tilting of the seat is constituted by a horizontal pivot pin 40 perpendicular to the median plane of the chair and by a support surface 41 which prevents forwards tilting. In the embodiment of FIG. 7, this device is constituted by a single unit which is fitted on the rod of the jack. The return of the arrangement to the horizontal position may be ensured by a rubber extensible spring or a similar device not shown in FIGS. 5 and 6. According to another variation of the invention, the platform of the seat is mounted on a single jack provided with its buttress and stop, as well as a device facilitating variation of its position. The jack may be placed on a rotating base which is eccentric with respect to the arrangement. Such a variation corresponds to FIGS. 5, 6 and 7.

According to another feature of the invention, the jacks use a fluid available on board the aircraft. Pneumatic jacks are preferably used, which, owing to the compressibility of the gases, are better able to ensure damping of the accelerations and a flexible suspension of the seat arrangement. In the case of an aircraft, downwards accelerations are neutralised by the compression of the gas in the lower chamber of the jack. Upwards accelerations are absorbed by maintaining a residual pressure or adequate counter-pressure in the upper chamber.

In addition, the chair according to the present invention may have the lower part of its back mounted to pivot about a fixed horizontal pin with respect to the floor supporting the seat, a locking device being provided to make it possible to lock the back in several predetermined positions.

According to another feature of the invention, the back of the chair is constituted by two parts pivotable with respect to each other about a horizontal axis perpendicular to the median axis of the arm-chair and which makes it possible, when the seat is unoccupied, to fold the upper part of the back forwards, and thus to use it as a table, for example.

Figure 8:
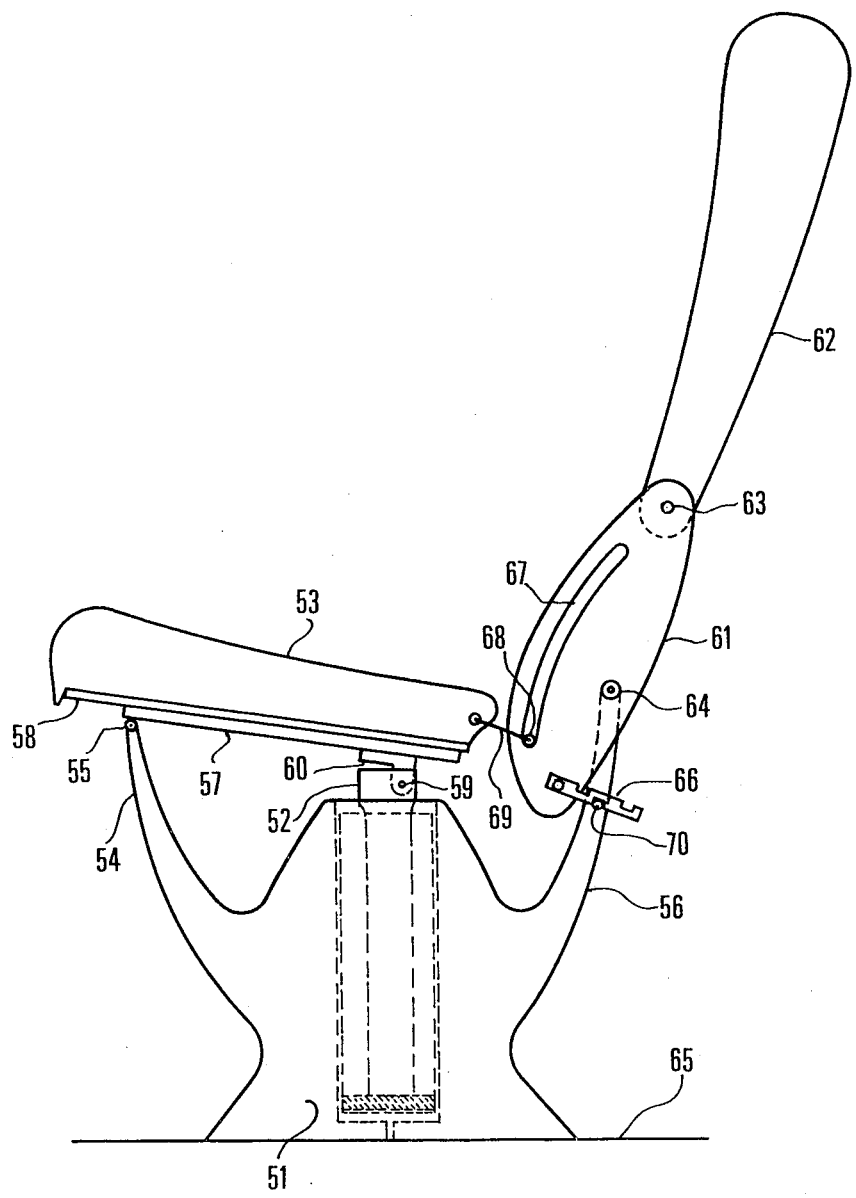
FIG. 8 shows another embodiment of a chair according to the invention, with the chair occupying the lower position.
Figure 9:
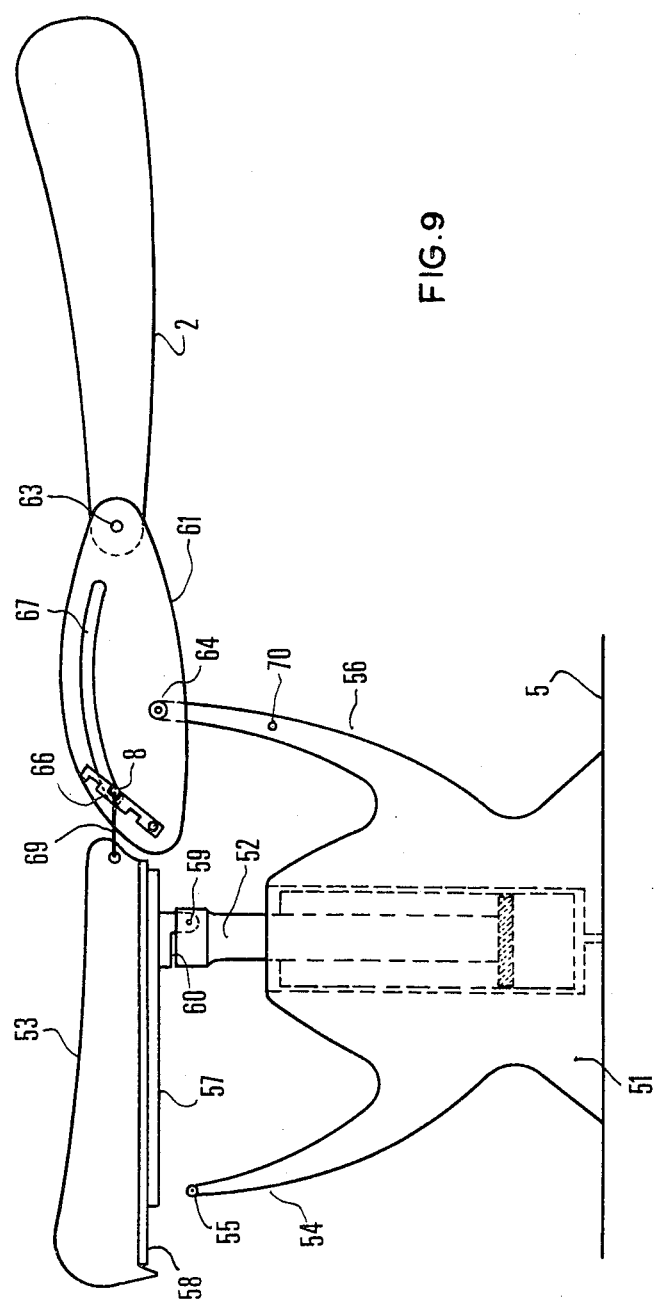
FIG. 9 shows the chair of FIG. 8, but in which the back has been inclined into a horizontal position in order to convert it into a bed

According to the embodiment shown in FIGS. 8 and 9, the base 51 is divided into three parts, whereof the central part encloses the body of the pneumatic jack or jacks 52 for adjusting the height of the seat 53. The front part of the base is constituted by a buttress 54 provided with rolling means 55 at its upper end. The rear part 56 of the base serves as a support for the back. The seating arrangement of the chair is constituted by the following parts:

a plate 57 connected to the jack or jacks 52 by means facilitating a variation of position in the forwards direction, whilst preventing a tilting movement towards the right or left;

a carriage 58 which slides on said plate 57 and which is longer than the latter in the front to back direction;

the seat proper 53 which is made integral with the carriage 58 and which has the same dimensions as the latter.

In the embodiment of FIGS. 8 and 9 the device for adjusting the height of the seat is composed of two jacks 52 arranged side-by-side and with sufficient spacing to allow a passenger occupying the place immediately behind to stretch out his legs, the upper ends of the rods of the jacks 52 also being provided with a device connecting them to the plate 57 of the seat. This device comprises a horizontal pin 59 which is perpendicular to the median plane of the chair, said pin facilitating the pivoting of the seat. The device also comprises a horizontal support surface 60 preventing the seat from tilting forwards.

The back of the chair is constituted by a lower part 61 and an upper part 62 interconnected by a horizontal pivot pin 63 which is perpendicular to the median plane of the chair. The lower part 61 of smaller dimensions than the upper part is mounted to pivot about a horizontal pin 64 which is fixed with respect to the floor 65 supporting the arm-chair. This pivot pin 64 is fixed to a support 56 which is integral with the base, the lower part of the back being provided with a locking device making it possible to lock the back in several predetermined positions. This locking device is constituted by a locking latch 66 having several positions. It is clear that this latch 66 may be replaced by a conventional locking device on the pin 64 such as a ratchet wheel co-operating with the movable pawl. Moreover, this same lower part 61 of the back comprises, on its lateral faces, a curved rail or slide 67 which is parallel to the lines joining the front side and the side faces of the part 61 of the back. A roller 68 located at the rear end of each rod 69 for retaining the seat rolls or slides in this rail 67.

The upper part 62 of the back may tilt forwards into a horizontal position by pivoting about the pin 63 which connects the two parts of the back. This pivot 63 is provided with conventional locking means similar to those used in the current seats of certain air lines.

When the lower part 61 of the back is locked by means of locking latches 66, the kinetics of the seat remain absolutely identical. On the other hand, in the lower position and after having unlocked the latch 66, the back may pivot freely about its pin 64. Then by the simultaneous action of a thrust exerted upwardly by the jacks on the seat arrangement and, for example, by a thrust exerted rearwards by the back of the passenger on the back of the chair, the seat is brought into a horizontal position and the back tilts rearwards into a horizontal position. Such a position of the chair is illustrated in FIG. 9, where the chair may be used as a bed. It is thus indispensable that the rear part of the seat 53 is complementarily contoured with the front part of the lower part of the back. For example, in the embodiment of FIG. 9, the rear part of the seat 53 is terminated by a bevelled shape.

Modifications may be made to the embodiment shown in FIGS. 8 and 9. Thus, any means for locking the part 61 of the back may be provided. In particular, the latch 66 may be replaced by conventional locking means on the pin 64 supporting the back, such as a ratchet wheel co-operating with a movable pawl.

According to another feature of the invention, it is also possible to use the latch 66 or to provide another device for keeping the pulley 68 in contact with the lower end of the slide 67 or more generally preventing its displacement in this slide. This proves particularly advantageous when the seat is in the lower position and when the latch 66 is unlocked, with respect to the stop 70, the roller 68 being kept in contact with the lower part of the slide 67, the single action of the lifting device in an upwards direction makes it possible to raise the seat and simultaneously tilt the back rearwards into a horizontal position.

As shown in FIG. 9, it is possible, for example, to use the same latch 66 for locking the back and for keeping the roller 68 in contact with the lower end of the slide 67 when it is desired to fold the back rearwards.

According to another modification, it is possible to separate the three parts of the base and to secure them separately to the floor supporting the chair.

Naturally, for the embodiments of FIGS. 8 and 9 it is possible to use pneumatic jacks as devices for adjusting the height of the seat, or even, without diverging from the scope of the claimed invention, it is possible to replace these jacks by any known appropriate mechanical elevator system.

According to one advantageous modification of the invention, in the case where the device for regulating the height of the seat is constituted by one or more pneumatic jacks or the like, the lower part of each jack body is connected to a pipe for supplying a compressible fluid under pressure, through the intermediary of a non-return valve. This non-return valve prevents the return of fluid to the supply pipe, which is in turn connected to a source of compressible fluid under pressure. Said source of fluid may be constituted by an individual pump actuated according to the desires of the passenger, and the cross-section of which is relatively slight with respect to that of the jack body.

Figure 10:
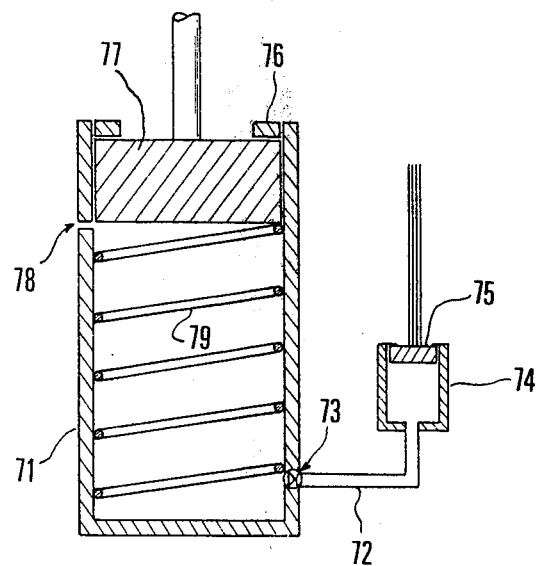
FIG. 10 is a sectional view of a particular embodiment of the device for adjusting the height of the seat of a chair according to the invention.

In FIG. 10, the lower part of the body 71 of the jack is connected to a supply pipe 72 for compressible fluid under pressure through the intermediary of a non-return valve 73. In this embodiment, the compressible fluid is quite simply constituted by air. The supply pipe 72 is connected to an individual pump 74 which may be directly actuated by the passenger as he desires. Advantageously, the system for controlling the pump 74 is connected to an arm-rest provided for the chair. Naturally, in an embodiment of this type, said arm-rest is arranged such that a movement intended to actuate the individual pump 74 may be imparted thereto. The piston 75 of the pump 74 is provided on its outer lateral surface with a lip seal allowing the inlet of air during its ascending stage.

Mounted at the upper part of the body 71 of the jack is a retaining member 76 intended to limit the upward stroke of the piston 77. This member 76 may, for example be made in the form of a detachable annular member.

It should also be noted that the lateral wall of the jack body advantageously comprises, in its upper part, an expansion aperture or orifice 78. This aperture is arranged such that when the piston 77 reaches its maximum height, the latter uncovers said aperture 78 and allows a free passage of the air contained in the jack body to the atmosphere. Thus, this aperture 78 makes it possible to prevent possible excess pressure in the jack body which could occur after improper operation of the pump 74. Similarly, it is indispensable to provide upwards return means, for example a spring 79, located inside the jack body, to prevent the piston 77 and its movable attachments (including the seat) connected thereto, descending under the action of its own weight, when the inner chamber of the jack 71 is connected to the atmosphere.

According to another additional feature of the invention, the arm-chair may advantageously comprise a device for locking the seat, which may thus be retained in any desired vertical position.

This embodiment may thus be used in the following manner:

When inoperative, the seat is in the upper position. When the passenger takes his place in the chair, the seat descends under the weight of the passenger. During this descent stage, the non-return valve 73 prevents any return of air to the supply pipe 72 and there is thus a compression of the air located inside the body 71 of the jack, this air having accumulated a certain energy.

When the occupant rises to leave his seat, the compressed air will expand and restore the energy which is has accumulated. This restoration is in the form of a return force which urges the seat upwards.

The individual pump 74 is intended to inject air into the body of the jack 71. The purpose of this is solely to obviate possible leakages of air which could have occured owing to an imperfect seal, or, to control the height of the seat in the case where the chair is not equipped with a device for locking the seat or when the latter has been released.

In both cases, it should be taken into account that the force exerted by the pump 74 remains relatively slight, since, it is only added to the force resulting from a certain quantity of energy accumulated by the air during the decent of the seat and which tends to be exerted in an upwards direction.

What is claimed is:

1. An adjustable chair comprising:
a base adapted to be fixed to a floor
a back pivotally connected to the base, at least the lower part of the back being mounted to pivot about a horizontal pin whose axis is stationary with respect to the floor supporting the chair,
a locking device for locking the back in any of several inclined positions,
a seat,
an adjustment device between the seat and the base for vertically adjusting the position of the seat with respect to both the base and the back,
a carriage supporting the seat, and means mounting the carriage on the adjustment device, the mounting means permitting forward and rearward movement of the seat with respect to the base as well as pivotal movement of the seat with respect to the base, and
a retaining connection for maintaining a predetermined spacing between the rear part of the seat and the front part of the back throughout the relative movement between the seat and back.

2. A chair according to claim 1 wherein the retaining connection comprises an elongated guide means carried by the back, a rod projecting from the seat toward the back, and a roller carried by said rod and slidable along the guide means.

3. A chair according to claim 1, in which the spacing between the rear part of the seat and the front part of the back is small in order to retain a substantially exact tangency between those two parts.

4. A chair according to claim 1, in which the adjustment device comprises a mechanical elevator system for the seat.

5. A chair according to claim 1, in which the adjustment device comprises at least one fluid jack.

6. A chair according to claim 5, in which the adjustment device comprises two fluid jacks located in the median plane of the chair.

7. A chair according to claim 5, in which the adjustment device comprises a front pair of fluid jacks and a rear pair of fluid jacks.

8. A chair according to claim 5, in which each jack has a rod, and the upper end of the rod of each jack is provided with a device comprising a horizontal pin perpendicular to the median plane of the chair, said pin facilitating the pivoting of the seat, and a horizontal support surface preventing the forwards tilting of the seat.

9. A chair according to claim 7, in which the front jacks have a different adjustment stroke from the rear jack or jacks, which facilitates a variation of the tilt of the seat.

10. A chair according to claim 5 in which a tilt variation of the seat is obtained by at least one stop against which bears the front part of the seat.

11. A chair according to claim 5, in which the base is provided with fluid distribution means for supplying each jack, thus facilitating the adjustment in height of the seat of said chair.

12. A chair according to claim 5, in which the lower part of the body of each jack is connected to a supply pipe for a compressible fluid under pressure through the intermediary of a non-return valve which prevents the return of the fluid to the supply pipe, said supply pipe being connected to a source of compressible fluid under pressure.

13. A chair according to claim 12, in which the source of compressible fluid under pressure is constituted by an individual pump belonging to each chair and actuated, as desired, by the person carrying said arm-chair.

14. A chair according to claim 13, in which the cross-section of the individual pump is relatively small with respect to that of the jack body.

15. A chair according to claim 12, in which the body of each jack comprises, in its upper part, at least one expansion aperture facilitating a connection to the atmosphere of the jack cylinder, the position of each expansion aperture corresponding to a connection of said chamber to the atmosphere when the piston of the jack reaches a height corresponding to the maximum height of the seat of the chair.

16. A chair according to claim 15, in which each jack comprises an upwards return means intended to prevent the piston from descending under the action of its own weight as well as that of the moving attachment connected thereto when the piston uncovers the expansion aperture or apertures thus causing the chamber of the jack to be connected to atmosphere.

17. A chair according to claim 12, in which the seat is retained in any desired vertical position by means of a locking mechanism.

18. A chair according to claim 1, in which the locking device is constituted by a locking latch having several positions and is located between a location at the lower part of the back and another location supporting the pivot pin of the back.

19. A chair according to claim 2, in which the lower part of the back is provided with a device which prevents the displacement of the roller of the retaining connection such that the adjustment device, when the back pivots freely about its horizontal pivot pin, raises the seat and simultaneously causes a pivoting of the back in a rearwards direction about its pivot pin.

20. A chair according to claim 19, in which the displacement preventing device is constituted by the same latch serving for locking the back.

21. A chair according to claim 1 in which the rear part of the seat is complementarily contoured with respect to the front part of the lower part of the back.

22. A chair according to claim 1, in which the back is constituted by two parts pivotal with respect to each other about a horizontal axis perpendicular to the median axis of the chair.

* * * * *